United States Patent [19]

Grundy et al.

[11] Patent Number: 4,546,656

[45] Date of Patent: Oct. 15, 1985

[54] TENSION MEASURING DEVICE AND METHOD FOR FILAMENTARY MATERIAL

[75] Inventors: Reed H. Grundy, Murrysville; James W. Koewing, Bethel Park, both of Pa.

[73] Assignee: PPG Industries, Inc., Pittsburgh, Pa.

[21] Appl. No.: 561,612

[22] Filed: Dec. 14, 1983

[51] Int. Cl.$^4$ ............................................. G01L 5/10
[52] U.S. Cl. ..................................... 73/862.48; 73/9; 73/862.04
[58] Field of Search ................ 73/160, 862.04–862.07, 73/862.45, 862.47, 862.48, 159, 9

[56] References Cited

U.S. PATENT DOCUMENTS

| | | |
|---|---|---|
| T934,002 | 5/1975 | Trail, Jr. . |
| 2,329,541 | 9/1943 | Kuehni ............................ 73/862.06 |
| 3,186,220 | 6/1965 | Flinth . |
| 3,204,454 | 9/1965 | Friman et al. . |
| 3,376,740 | 4/1968 | Harvey . |
| 3,444,731 | 5/1969 | Nieuweboer . |
| 3,495,454 | 2/1970 | Heimes . |
| 3,498,771 | 3/1970 | Bird et al. . |
| 3,526,130 | 9/1970 | Canfield . |
| 3,589,181 | 6/1971 | Palmatier et al. . |
| 3,619,805 | 11/1971 | Bean . |
| 3,650,717 | 3/1972 | Canfield . |
| 3,739,633 | 6/1973 | Saxl ................................. 73/862.47 |
| 4,042,876 | 8/1977 | Visioli, Jr. . |
| 4,052,891 | 10/1977 | Bartlett . |
| 4,067,234 | 1/1978 | Seney . |
| 4,130,014 | 12/1978 | Eddens . |

FOREIGN PATENT DOCUMENTS 0656926  9/1951  United Kingdom ............. 73/862.06

OTHER PUBLICATIONS

H. U. Mittmann et al., "A New Device for Simultaneous Measurement of Friction Force, Normal Force & Friction Coefficient", WEAR, vol. 31, No. 1, pp. 179–184, Jan. 1975.
Technical Bulletin 7003A–Modular LVDT Signal Conditioners by Engineering, Pennsauken, NJ.
Technical Bulletin 7005–LVDT Transducer Instrumentation by Schaevitz.
Article entitled "Modern Strain Gage Transducers . . . their Design and Construction by Epsilonics", Jul. 1982

Primary Examiner—Charles A. Ruehl
Attorney, Agent, or Firm—Kenneth J. Stachel

[57] ABSTRACT

The tension of filamentary material under tension in a process can be measured with improved accuracy. The measurement is effected by the tension measuring device having an elongated, externally insulated housing which substantially surrounds and encompasses a solid, continuous beam cantilever-mounted coaxially with the housing. The beam extends beyond the housing through an opening at the other end of the housing from its mounting to an engagement means for the filamentary material. The beam has at its distal end within the housing two or more target means located in a relationship to each other along different axes in the same plane where the target means are in sensing engagement with a sensing means which extend into the housing from a point of attachment on the housing. The opening of the housing is substantially covered by a shield through which the beam passes and to which there is mounted a strand contacting means. The housing has a gas supply means supplying gas from a source into the housing to move freely and exit through the opening between the shield means and the housing. The sensing means are connected to a conducting means to convey signals to an indicating means. The method of measuring tension during the formation of a plurality of fibers involves forming fibers, gathering fibers on a gathering means which is the engaging means of the tension measuring device, and off-centered winding of the gathered strands.

25 Claims, 5 Drawing Figures

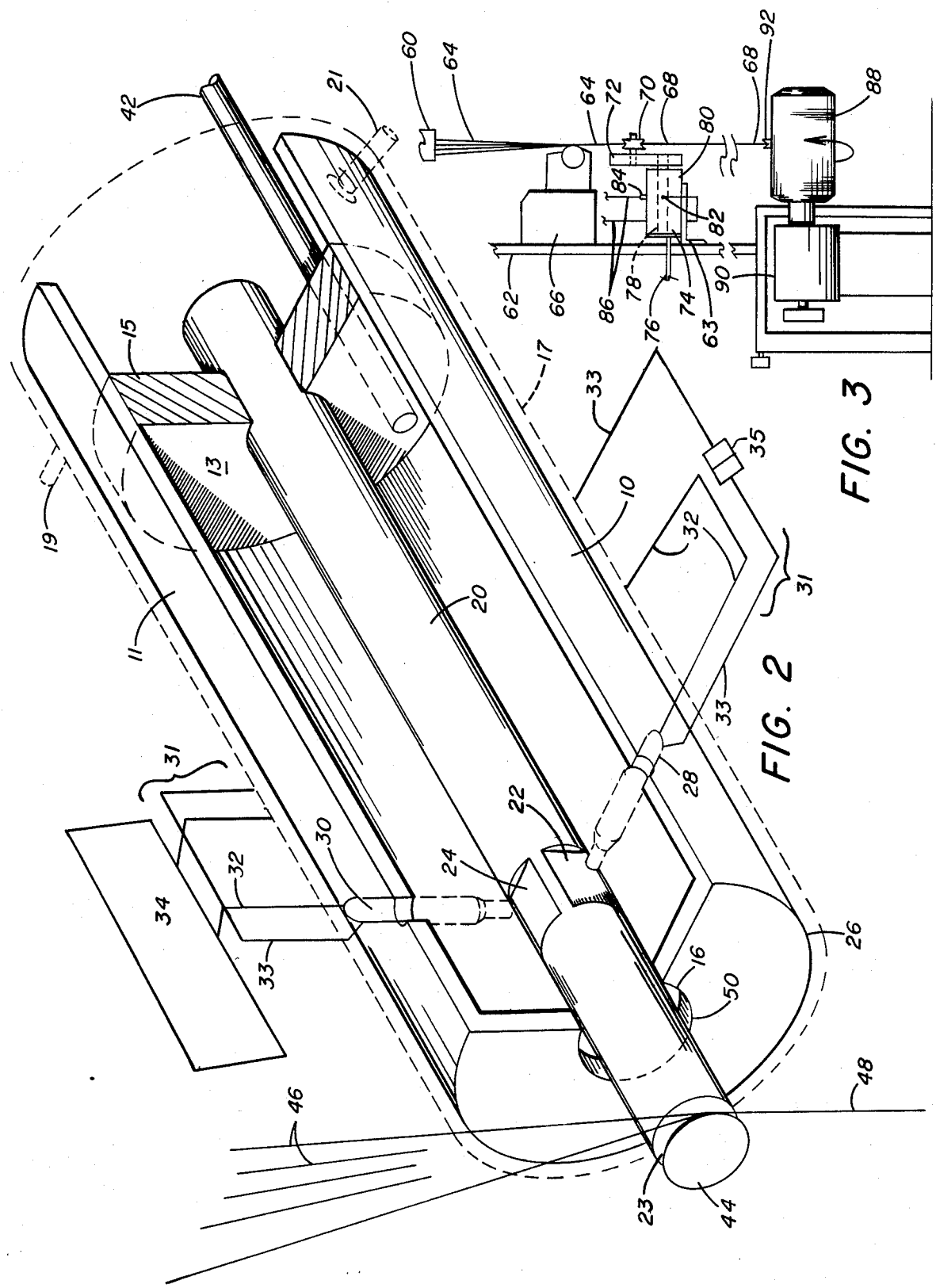

TENSION MEASURING DEVICE AND METHOD FOR FILAMENTARY MATERIAL

The present invention is directed to a tension measuring device that measures the forces due to tension in at least two nonlinear directions to each other for filamentary material being pulled from one location to another. Another aspect of the present invention is directed to a method of forming one or more strands from a plurality of fibers and measuring the forces due to tension in at least two nonlinear directions to each other on the strand during the forming process.

In the textile industry, tension is imparted to fibers and strands, when the fibers and strands are wound onto and unwound from various winding Packages and from various supply packages. This tension can be measured by any of the numerous commercially available tension measuring devices. The most common type of tension measuring device used in the textile industry is an inferential tension measuring device rather than a direct tension measuring device. The inferential device measures tension, when the fibers or strands pass through a guide system to contact a sensing arm, which is displaced by the component of the fibers or strands. The displacement of the arm activates a tension indicator through mechanical, electrical, pneumatic, hydrolytic or hydraulic means. For example, when electrical means are used, the displacement of the sensing arm initiates a change in inductance, capacitance, electromotive force or resistance of a sensitive cell, which indicates through a meter movement the magnitude of the tension.

The guide systems of these tension measuring devices involve at least partially bending the fibers or strands around a number of rollers in a series of rollers. The guide systems of some of these measuring devices bend the fibers or strands no less than three times around three separate pulleys or rolls in order to measure the tension of the fibers or strands. With each bend or wrap of the fibers or strands around the rolls, inaccuracies are introduced into the tension measurement, because of the additional uncompensated friction which the fibers of strands encounter at each bend around the rollers. These inaccuracies can be reduced to approach zero for rollers other than the center roller on the guide system by reducing the degree of wrap of the fibers or strands around the rollers.

Even with such a reduction, the friction resulting from fiber or strand contact with the central roller not only leads to some inaccuracy but also results in the need for calibration. Every time the tension measuring device is used for tension measurement of fibers or strands with different physical dimensions and/or chemical characteristics, i.e., different fiber diameter, different fiber coating, or a different number of fibers in a strand, the friction about the central roller will change. As a result, the tension measuring device requires calibration everytime it is used with fibers or strands of different physical or chemical characteristics.

The approach of reducing inaccuracies in traditional tension measuring devices by reducing the degree of wrap about the rollers would eliminate the possibility of using existing rollers over which the fibers or strands are wrapped in textile processes as the rollers for use in measuring tension. Some of the processes in the textile industry, where a degree of wrap of the fibers or strands around a roller is necessary for the process include: forming strand from a plurality of fibers, where the rollers are gathering shoes, and winding or rewinding strand from one package to another. Therefore, in these and similar processes such rollers could not be used to assist in tension measurement because the degree of wrap about the roller if reduced to approach zero could detrimentally affect the process.

The measurements of tension on strands that are formed from a plurality of filaments being drawn from a source of supply of filament forming material involves the use of a tension measuring device in what can be a rather difficult environment for a measuring device. Typically, fibers are formed from a source of fiber forming material at elevated temperatures and in the presence of sprays of water or chemical compositions used to size the fibers after their formation. The environment of fiber formation limits the placement of a tension monitoring device to locations in the process where the heat and moisture would not affect the tension measurements. For all practical purposes, the influences of heat and moisture from the forming process cannot be completely eliminated in using currently available tension monitoring devices. Therefore, in addition to the inaccuracy in the tension measurement due to friction added by the rollers of the tension measuring device, when measuring tension during fiber formation additional inaccuracies creep into the measurement of the tension from the heat and moisture present in the environment of fiber forming process.

An example of a tension measuring device and a method for measuring tension in linear materials such as glass fiber strands is shown in U.S. Pat. Nos. 3,526,130 and 3,650,717 (Canfield). In these patents, the tensile forces are measured in traveling linear flexible material by turning the linear material a predetermined angular amount along a surface, which is connected by a horizontal member to a longitudinal member in which strains are induced at a location along its length. The strain in the longitudinal member is sensed as an indication of the magnitude of tension on the material. As with the commercially available tension measuring devices, this device would not measure the component of friction experienced by the strand in turning the strand a predetermined angular amount on the surface. Also, if this device is located too close to the fiber forming section of a fiber forming process, additional inaccuracies in the tension measurement would be experienced due to the heat, moisture and application of coating materials associated with the fiber forming process.

It is an object of the present invention to provide a tension measuring device, tensiometer, which has improved accuracy in tension measurement because it determines the coefficient of friction of filamentary material as it bends around a roller or contact device and because it reduces the effect of the environment on the measurement of the fiber or strand tension.

It is an additional object of the present invention to provide a measurement of input and output tension around a tensiometer as well as the coefficient of friction between the fibers and/or strand and the device in a fiber forming process which gathers the plurality of fibers into one or more strands.

It is a further additional object of the present invention to Provide an in-line tensiometer that does not affect the normal running of the fiber forming process and has improved accuracy.

It is an additional further object of the present invention to provide a method of forming fibers into strands, wherein the tension on the strands is more accurately measured.

SUMMARY OF THE INVENTION

These and other objects of the invention are accomplished by the tension measuring apparatus and process for filamentary matrial of the present invention.

The strand tension measuring device of the present invention has a housing which has a high resistance to the flow of heat and which has at least one peripheral side and one end to enclose a beam, which is cantilever-mounted within the housing. The other end of the housing has an opening through which the beam emerges from the housing and which allows for the radial deflective movement of the beam. Within the housing, the beam has at least two target means, which are located on the beam in relation to each other to be along at least two different axes of displacement of the beam. From the housing, at least two sensing means are in sensing engagement with the target means in a one to one relationship to sense displacement along at least two different axes. At the distal end of the beam beyond the housing, the beam has an engaging means for the filamentary material, which allows the filamentary material to engage the beam. This engagement is sufficient for the filamentary material, which is traveling from one location to another, to deflect the beam and the target means. The deflection of the beam is sensed by both the sensing means, which in response produce signals corresponding to sensed displacements along different axes and to the force components of the tension including the coefficient of friction. A conducting means allows the sensing means to convey the signals from the sensing means to one or more indicating means. The indicating means can give the output from the signals as the horizontal and vertical components of the tension on the filamentary material which can be calculated into the magnitude of the tension and/or coefficient of friction. Also the indicating means can output directly the magnitude of the tension and/or the coefficient of friction or the tension compensated for any component due to friction introduced from taking the tension measurement. The coefficient of friction may be referred to as the drag vector due to contact of the filamentary material with the engaging means. Also, a gas supply means is attached to the housing to enable a flow of gas through the housing and out the opening in the housing through which the beam travels. The supply of gas retards the entrance of any liquids into the housing.

The method of measuring tension of one or more strands produced in a fiber forming process is accomplished by forming the fibers, treating the fibers with chemical compositions, gathering the filamentary material into one or more strands at a gathering means, measuring the tension on the one or more strands as force components having a nonlinear angular relationship, winding the strand off-center from directly under where the strand is gathered or directly under where the filamentary material is formed to cause a fixed angle of bending in the strand about the gathering means. The filamentary material can be formed from any source of heat softened, fiberizable material from any device known to those skilled in the art such as a bushing. The chemical composition that is used to treat the filamentary material as fibers during forming can range from nothing more than water to elaborate chemical sizing compositions having many components such as lubricants, film forming materials, wetting agents, emulsifiers for these chemical materials and the like.

The tension is measured as force components by virtue of the gathering means being mounted on a beam, which is cantilever-mounted for radial deflection in an enclosed housing. The mounting of the gathering means to the beam is beyond the housing enclosure, where the beam emerges from an opening in the housing enclosure. The housing is firmly mounted to a support to allow the gathering means to contact the fibers in order to gather the fibers into a strand. Within the housing, the beam has at least two target means located at an angular relationship of other than 180° to each other on the beam, which are in sensing engagement with at least two sensing means extending from the housing and having a nonparallel, non-opposing relationship to each other. The sensing means are in a one to one relationship with the target means so that when the beam radially deflects, the sensing means detects the beam deflection. The sensing means initiate signals in response to the detected deflection. The signals are conduced to one or more indicating means to give the output of the signals. The indicating means can give the output of the signals as the force components corresponding to the sensed deflections which can be calculated into the tension, or can directly indicate the tension compensated for any coefficient of friction introduced in taking the tension measurement.

BRIEF DESCRIPTION OF THE DRAWINGS

FIG. 2 is an isometric, cutaway view, of an alternative embodiment of the tension measuring apparatus of the present invention.

FIG. 3 is a side view of a diagramatic illustration of a glass fiber strand forming process, wherein the gathering shoe used in the process is part of the tensiometer of the present invention.

DETAILED DESCRIPTION OF THE INVENTION AND PREFERRED EMBODIMENT OF THE INVENTION

Figure 1:
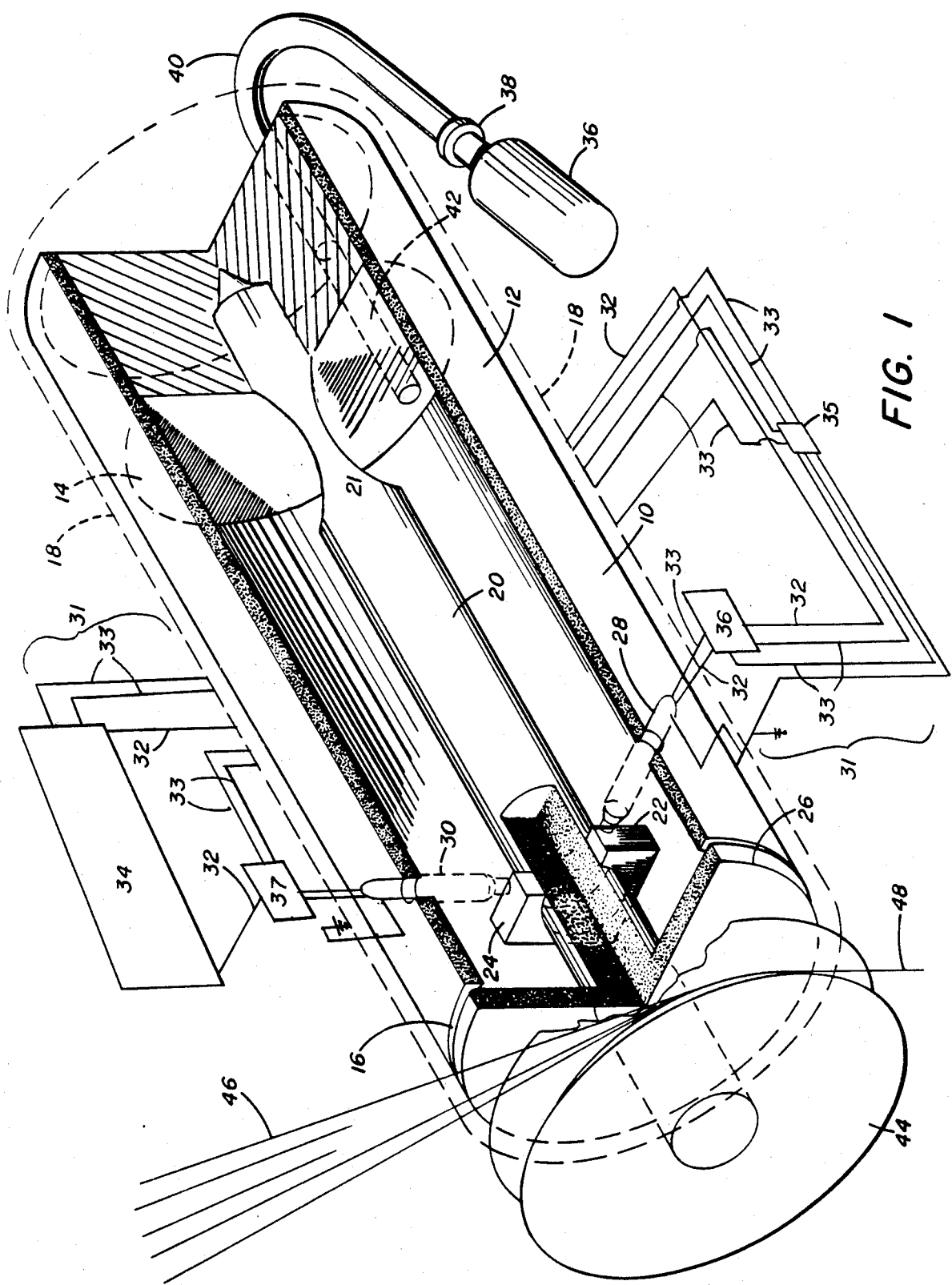
FIG. 1 is an isometric, cutaway view of the tension measuring apparatus of the present invention having a diagramatic connection for a sensing means to a tension indicating means and diagramatic connection to a gas supply meads.

Several of the numerous improvements available from the apparatus and method of the present invention include: reducing the need to recalibrate the tension measuring apparatus when there is a change in chemical and/or physical characteristics of the fibers or strands to be measured for tension, improved accuracy in measuring tension by accounting for the horizontal and vertical force components of tension and determining the tension with compensation for the effect due to friction, and improved accuracy in measuring the tension of filamentary material like yarns, fibers and strands during the process of forming the yarns, fibers or strands.

The accuracy of measuring the tension of fibers and/or strands during a process of forming the fibers and gathering them into one or more strands is complicated by numerous aspects of the fiber forming process. Typically, fibers are formed from heat softenable materials, sprayed with water and/or chemical treatments and gathered into one or more strands by winding the gathered strand or strands into a package. In these steps, the aspects of heat and moisture and chemical coatings complicate the measurement of the tension on the fibers or strands during forming. The heat from the heat softenable material accompanies the fan of fibers pulled from the heat softened material for a considerable distance along the process for gathering the fibers into strands. The heat would affect any tension measuring device placed on the fibers or strands at this portion in the process. The effect would be retarding the recovery time of the tension measuring device for the next measurement of tension after a preceding measurement of tension. This discrepancy is caused by the thermal expansion of the elements in the tension measuring device including any sensing devices and deflecting means. The moisture present in the fiber forming process is another factor that complicates the measurement of the tension. The moisture is dispersed onto the tension measuring device itself and causes the accumulation of moisture on the device. Also, chemical coating compositions can accumulate on the tension measuring device.

The accuracy of measuring tension on filamentary material like fibers, strands, and yarns, is also affected by the very method of measuring that tension. When additional angles or bends are placed on the strand by rollers or levers, the coefficient of friction from the production of the angles and bends can cause a discrepancy in the tension measurement. Also, these additional angles and bends in the strands can detrimentally affect the efficiency of the fiber forming process. In addition, the accurate measurement of tension involves measuring tension with a device which is responsive in the linear portion of the stress/strain curve for the element of the tension measuring device being stressed and strained. So hysteresis within the tension measuring device should be kept to a minimum.

The tension measuring device of the present invention has a high resistance to the flow of heat, and can use the angles already existing in the fiber forming process for measurement of the tension on the fibers and/or strands and/or yarns, and measures at least two axes of force simultaneously and accounts for the coefficient of friction or drag vector to reduce the need for recalibration, when different fibers and/or strands and/or yarns are to be measured. Because of the at least dual force set-up in simultaneously measuring the major vertical component of tension with the horizontal component due to friction, true input and output tension can be measured along with the coefficient of friction.

Although the most advantageous use of the tension measuring device and method of the present invention is in-line in a process for forming fibers and strands, the tension measuring device can also be used anywhere where strands are being conveyed from one or more packages to a different set of one or more packages. Also, although it is most advantageous to use the tension measuring device and method of the present invention in-line in a process using existing angles and bends in the forming or conveying process of the strand, the tension measuring device of the present invention can also be used as a portable tension measuring device. Such a portable tension measuring device would have at least two rollers to cause a guide path for the strand so that a predetermined angle or bend is engendered in the strand to measure the tension.

Turning now to FIG. 1, there is shown the tension measuring apparatus of the present invention. A housing, 10, surrounds and encloses a substantial portion of beam 20. The housing can surround and enclose the beam by the use of any shape having one or more peripheral sides and ends such as cylindrical, rectangular, triangular and any other polyhedron and the like. The housing, 10, has an opening, 16, at one end through which the beam 20 emerges to engage the fibers 46 and/or strand 48. Preferably, the housing is cylindrical and the substantial portion of the beam surrounded and encompassed by the housing is all of the beam except that portion needed to contact the fibers or strands for which the tension is to be measured. The housing 10 has an end 14 which is located at the proximate end of beam 20 and can act as a base end to secure beam 20 within the housing 10 in a cantilever-mounted arrangement. The beam 20 could also be cantilever-mounted to the housing 10 where the end 14 is comprised of radial supports extending from the housing. The arrangement of beam 20 within opening 16 of the housing 10 in cantilever fashion allows for the radial deflection of the beam about a 360° radius around the central axis of the beam. The attachment of beam 20 to base side 14 or by the radial supports can be by any method of attachment known to those skilled in the art such as press fittings, clamp or pin attachments and nut and bolt attachments.

The housing 10 has a high resistance to the flow of heat by being constructed from material having a low coefficient of thermal expansion such as quartz, or composites of polymer reinforced with graphite-type fibers and the like. Also the housing 10 can be surrounded by a cooling jacket through which a cooling or heat exchange medium such as cool water or a fluorohydrocarbon gas is conducted. Another approach to give the housing a high resistance to the flow of heat is to insulate the housing. Also a combination of these approaches can be used to achieve the desired results.

In FIG. 1, there is a layer of insulation 18 around the exterior surface of the peripheral side 12 of the housing and the end 14. The layer has a thickness which is dependent upon the insulating qualities of the insulation and should have an equivalent thickness of around 10 to around 50 millimeters for insulation such as polyurethane foam. Other types of insulating materials can be used such as phenolic aldehyde condensates, urea aldehyde condensates, melamine aldehyde condensates, polystyrene foam, fiber glass insulation and the like. The housing 10, when used with the insulation or a coating jacket, can be made of any rigid material known to those skilled in the art such as metals like stainless steel and polymeric materials like molded polyesters and epoxies and phenolic, urea, and melamine aldehyde condensates. Generally, the dimensions of the housing 10 are sufficient to encompass and surround the substantial portion of the beam 20, where the beam has a length sufficient for it to act as a cantilever beam with a measurable deflection.

The beam 20 is cantilever-mounted in housing 10 preferably at base side 14. The dimension of the beam 20 is a length which allows it to extend through opening 16 beyond the housing to come in contact with fibers and strands that are to have their tension measured. The diameter of the beam is such that when the beam is displaced by the tension on the fibers or strands contacting the beam, the displacement can be measured, and preferably results in a response which falls in the linear portion of the stress/strain curve. The shape of the beam can be any shape known to those skilled in the art for use as cantilever beams such as cylindrical, rectangular, triangular, polyhedral and the like. Also, the beam can be hollow, although it is preferred to have a solid beam. Preferably, the beam is cylindrical in shape and has a diameter ranging from about 5 to about 15 millimeters and has a length ranging from about 70 to about 200 millimeters. The beam is preferably continuous to assure that the deflection of the beam falls within the linear portion of a stress/strain curve for the beam. Therefore, the deflection of the beam will be subject to little or no hysteresis effect for the deflection of the beam beyond the linear portion of the stress/strain curve for the beam. The diameter of the beam need not be uniform for the entire length of the beam. The beam may have a concavity or taper in the diameter toward the end of the beam proximate to the base side 14. Such a non-uniform diameter would be the hour-glass tapered section 21 of the beam 20. Whether or not the beam is tapered or has a non-uniform diameter depends upon the amount of tension to be measured in the fibers or strands. If the amount of tension is high, around 20 kilograms, the beam will have a sufficient diameter and length at a uniform diameter of around 15 millimeters and length of around 150 millimeters to be deflected in a measurable fashion. Where tension on the fibers or strands is less than 20 kilograms, the same diameter and length of the beam would not be suitable, and the beam should be and preferably is tapered. The taper can continue to a minimum diameter of around 1 to around 3 millimeters.

Located on the beam 20 within housing 10 are target means 22 and 24. Preferably, these target means are located at the distal end of beam 20 from the cantilevered-mounting. These target means are in nonopposing, nonparallel relationship and preferably in substantially 90° relationship to each other. The relationship of less than or more than 90° can be tolerated and corrected for in the sensing or indicating means portion of the tensiometer. The target means can be magnetic or resistive spots located on the beam where the deflection of the beam would cause movement of the magnetic and/or resistive spots and which would be sensed by appropriate sensing devices. Also, the target means 22 and 24 can be flat surfaces on the beam 20 such as a rectangular or square member 23 riding on beam 20. Also, the target means 22 and 24 could be flattened portions of beam 20 rather than being a separate member riding on beam 20. Where the beam 20 has a rectangular shape, the target means 22 and 24 would merely be locations at the distal end of the beam within housing 10 to which sensing means would be associated. The function of the target means is to provide a location on beam 20 which will be sensed by sensing means for the displacement or deflection of beam 20 in response to tension of the fibers or strands contacting beam 20 outside the housing.

The opening 16 of housing 10 can range in size from the complete end of housing 10 opposite the end where beam 20 is cantilever-mounted to the size of an opening sufficient for beam 20 to emerge and to deflect. When the opening 16 at the end of the housing 10 is larger than the space required for the beam to emerge and to deflect radially, the opening 16 is shielded by shield 26 to cover a substantial portion of opening 16 to retard the entry of moisture and other chemical compositions into the interior section of the housing. The substantial amount of the opening covered by the shield is any amount not needed for escaping gas from the interior of the housing where the gas is pumped into the housing to provide for a gas purge. Shield 26 can ride on beam 20 and not be connected to the housing so that opening 16 has been reduced to the space between shield 26 and housing 10. In this case, the shield should be made of a lightweight material such as aluminum or polymeric materials such as the phenolic, urea and/or melamine aldehyde condensates, polyalkylenes such as polyethylene and polypropylene, nylon polyesters and epoxies and the like.

In sensing engagement with the target means 22 and 24 are sensing means 28 and 30 respectively. The sensing means are located to associate in a one to one relationship with the target means and preferably in an approximately 90° relationship to each other for target means similarly disposed. The sensing means 22 and 24 pass through housing 10, where they are held in attachment with the housing 10. The sensing means 22 and 24 are securely attached to the housing to be maintained in sensing engagement with the target means. The sensing engagement with the target means can range from a gap between the target means and the sensing means generally from greater than zero to about 0.5 millimeters and preferably about 0.005 to about 0.3 millimeters. The type of sensing means used must correspond with the type of target means used. For example, if the target means 22 and 24 are resistive areas then sensing means 28 and 30 should be eddy current displacement transducers like those available from Kaman Sciences Corporation, Colorado or like those described in U.S. Pat. No. 4,042,876 entitled "Eddy Current Gauge for Monitoring Displacement Using Printed Circuit Coil", which is hereby incorporated by reference. If the target means are magnetic cores then the sensing means should be linear variable differential transformers (LVDT) like those available from Schaevitz Engineering, Pennsaulin, NJ. Preferably, the former system is used, where the sensors have a product designation of KD 2310-0255 electronic units. Also the sensing means can be of other types when the target means are flat surfaces. Types of sensing means used in this case include strain gauges, foil-type and coil-type sensor elements and any other sensor elements of known construction which can be adhesively attached or mechanically held to the housing. The sensing means also have connections, preferably electrical connections, outside or at the surface of the housing or outside the insulation layer 18 to a conducting means 31.

The preferred conducting means for the present invention is an electrical conducting means as illustrated in FIG. 1. The conducting means 31 is power supply circuit 33, signal conditioner 36 and 37 and signal conducting circuit 32. The conducting means enables the sensing means 28 and 30 to initiate signals in response to a displacement of beam 20. These signals are conveyed by the conducting means 31 to an indicating means 34. The power supply circuit 33 provides power to the sensing means 28 and 30 via the signal conditioners 36 and 37, and to the signal conditioners 27 and 29, and, if needed, to the indicating means 34. The power for the power supply circuit 33 is from power supply 35, which can be any device known to those skilled in the art for powering sensing means, signal conditioners and indicating means. Nonexclusive examples of power supplies include: alternating current supplies, direct current supplies, and solar supplies. Although the power supply circuit is indicated in FIG. 1, as supplying all the power needed for the sensors, conditioners and indicators, separate power supplies may be used for each of these. Also, FIG. 1 indicates examples of ground wiring for the power supply circuit and signal conducting circuit. Any other circuit arrangements for electrically powering sensors, signal conditioners and signal indicators that are known to those skilled in the art may be used. Preferably, the power supply for the Kaman Eddy Current sensors is a direct current power supply. A nonexclusive example of a power supply is the dual voltage power supply available from Hewlett-Packard Company, California under the product description 6205. In addition, conducting means 31 provides for signal conditioning by the signal conditioners 36 and 37 for each signal initiated by the sensing transducers 28 and 30 respectively. Since the signal initiated by the sensing transducers are generally very small in magnitude, the signals must at least be conditioned by amplification. In addition, depending on the Particular type of sensing transducers used, the transducing signals may have to be demodulated, filtered or converted from current to voltage or vice versa. In addition, the signal conditioners can receive the power from the power supply before the sensing transducers to provide excitation of the input to the sensing transducers. For example, the LVDT type sensing transducers require constant amplitude AC voltage at a frequency not readily available. So the conditioner would also have an amplifier with amplitude regulation on its output to provide the necessary input to the sensing transducer from an AC power supply. For a DC power supply, an oscillator of appropriate frequency would be used before the amplifier. Although for some sensing means, the power supply may be connected directly to the sensing means. The signal conditioners 36 and 37 may also provide for scaling of the signals from the sensing transducers 28 and 30. Scaling allows for a relationship of the voltage or current changes initiated by the signals of the sensing means 28 and 30 to units of force for measuring tension. Scaling can be accomplished by any method known to those skilled in the art for relating measurement units of one energy form to units of another energy form. For instance, one or more potentiometers can be connected in parallel with each amplifier for the outut signals of the sensing means. The potentiometers are set to determine the output voltage Per beam displacement in some calculatable relationship, preferably a 1:1 relationship.

Indicating means 34 receives the output signals generated by the sensing means 28 and 30 which are conveyed to it by conducting means 31 in response to a deflection of beam 20. The indicating means 34 can be comprised of one or more indicating devices to indicate the separate outputs of the sensing means or to indicate separate scaled outputs from signal conditioners 36 and 37 or to perform calculations on the outputs from the sensing means to indicate tension. When the indicating means indicates the separate outputs of the sensing means, the indicating means can be comprised of two indicating devices. For electrical conducting means, a nonexclusive example includes two digital voltmeters such as Fluke voltmeters under the product designation of 8000A. The voltmeters can read the difference in voltage resulting from deflection of beam 20 as a change in the source voltage or the voltmeters can be brought to zero for no deflection of beam 20 and read just the change in voltage due to the beam's deflection. Also the voltaeters can be scaled to read a change in volts as a change in gram, kilograms or any weight or force unit to indicate the force components of tension. With the force components of tension, the true tension in and out can be calculated as explained with FIGS. 4 and 4(a). These values can be calculated in any manner known to those skilled in the art on any devices known to those skilled in the art including computers programmed with algorithms including the formulae described with FIGS. 4 and 4(a). The computer could be wired directly to the indicating means 34 to yield values for the tension in and out of the predetermined angles of bend of the fibers or strands.

In FIG. 1, housing 10 also is fitted with port 42 through base side 14 which is attached to conduit 40 which is outside the insulation layer 18 so that gas can be conveyed to the interior of housing 10. The gas is conveyed to port 42 through conduit 40 from a gas supply source 38. The gas, which can be purge gases such as nitrogen or air or any similar gases but is preferably air, passes from the gas supply source through a valve 39 and into conduit 40. The gas is at a suitable pressure to deliver a gas pressure within housing 10 of generally around 10 to about 80 psig and preferably about 10 to about 40 psig. The gas freely moves around the interior of housing 10 and flows out opening 16 with sufficient force to retard the entrance of moisture and other chemical compositions which may be encountered in placing the housing near the proximity of a fiber formation process. The gas supply source 36 can be remote from the housing 10 and conduit 40 can be of any sufficient length to attach the gas supply source to housing 10 or the gas supply source can be a small cartridge like carbon dioxide cartridges attached to the outside of insulation layer 18 in such a manner to supply a nearly constant temperature gas to the interior of housing 10. Such attachment can be by any method known to those skilled in the art such as brackets and bolts or screws or adhesives.

The beam 20 extends beyond opening 16 of the housing 10, where shield 26 is carried on beam 20 so that the shield covers a substantial Portion of opening 16 in the housing. Beyond shield 26, a gathering means 44 for the fibers is mounted on beam 20. The mounting can be a rotatable mounting or a stationary mounting. The gathering means can be a gathering shoe which is a circular device having a V-groove in the peripheral surface so that the fibers contact the peripheral groove and are gathered into a strand. Also, the gathering device can be a portion of the circular shoe, which is mounted in a stationary fashion on the distal portion of beam 20 extending from opening 16 after shield means 26. The fibers 46 pass in contact with the gathering device 44 and are gathered into strand 48. This contact will cause a displacement of beam 20, which will result in a comparable displacement of target means 22 and 24. The sensing means 28 and 30 respectively will sense the displacement of the respective target means and respond by sending a signal via conducting means 31 to indicating means 34 which will indicate a tension for the fibers 46 and strand 48. The gathering device need not gather fibers into strands but may merely convey a strand from one location to another. The gathering device in this case merely constrains the strand so that it can be passed in a definite direction.

Turning now to FIG. 2, there is illustrated an alternative embodiment of the tension measuring device of the present invention. Similar numerals in this figure and FIG. 1 relate to similar elements of FIG. 1. In FIG. 2, beam 20 is a solid and continuous beam without a taper and is securely mounted to a peripheral side, 11, of housing, 10, by radial support 13. The housing 10 has an end, 15, near the mounting of the beam, where the end serves as a cover. At the opposite end of the housing from where beam 20 is mounted, the beam extends beyond housing 10 through opening 16. Beam 20 has a strand contacting means 44 which is a groove 23 cut into beam 20. Here the strand contact means performs the same function as the fiber gathering means 44 of FIG. 1. The target means 22 and 24 are flattened surfaces of beam 20. The opening 16 of housing 10 is of sufficient size to allow for the emergence of beam 20 from housing 10 and also to allow for displacement of beam 20 in response to the tension of fibers 46 and strand 48 at gathering means 44. Generally, opening 16 has a size which is about 2 times the volume occupied by beam 20 passing through opening 16. The gas supply port 42 is connected in a similar manner as is shown in FIG. 1. With the gas supply to the interior of housing 10, the gas escapes the interior of the housing through opening 16. On housing 10, instead of the insulation layer 18 that surrounds the housing 10 of FIG. 1, there is a cooling jacket 17 which surrounds at least the peripheral side of housing 10. The cooling jacket maintains the housing 10 near a constant temperature. The cooling jacket can be filled with any cooling medium such as gas or cool water through inlet 19. The water jacket can be gravity filled, when water is the medium, by filling the jacket while the tensiometer or housing 10 is in an inverted position. With the continuous supply of water, the housing is turned right side up with the overflow of water flowing out of jacket 17 through outlet 21. The supply of cooling medium can come from and can be conveyed by any appropriate source of supply and conveyance mechanism known to those skilled in the art.

The sensing means 28 and 30 are connected to conducting means 31 for conveyance of signals that are initiated by the sensing means in response to the displacement of beam 20 to the indicating means 34. The conveyance by the conducting means can occur electrically, mechanically, pneumatically or hydraulically. To accomplish the conveyance of the signals, the conducting means 31 generally has at least one set of conducting connections 33 to a power supply 35. The power supply can be any known device for powering sensing means. A nonexclusive example of a power supply for an electrical conducting means is the dual voltage power supply available from Hewlett-Packard Company, California, under the product description 6205. A nonexclusive example of a power supply for a pneumatic conducting means would be a source of pressurized gas. The conducting means has another set of connections 32. These connections associate the sensing means 28 and 30 and at least one indicating means 34 for conveyance of the signals from the sensing means 28 and 30 to the indicating means 34. These connections make it possible for the indicating means to provide an indication of tension compensated for any friction introduced in performing the measurement. The indication of tension preferably is a result of the target means and sensing means being located in a one to one relationship. One target means and one sensing means are in approximately 90° relationship to another target means and sensing means to provide for maximum sensitivity. The orthogonal measurement of the tension will be more fully discussed in connection with FIGS. 4 and 4(a).

FIG. 3 illustrates the tension measuring apparatus of the present invention and the method of using the apparatus in a process of forming fibers from a heat softened material and gathering the fibers into one or more strands. The fibers 64 are attenuated from a heat softened material such as fiberizable glass compositions, polyesters, polyamides and cellulosic material and the like contained in a supported fiber forming apparatus 60. The fiber forming apparatus can be a bushing in the case of formation of glass fibers or a spinarette in the case of the fiberization of other types of fibers. Preferably, the tensiometer of the present invention and method are used in the manufacture of glass fibers. The glass fibers can be formed from any fiberizable glass composition such as "E-glass", "621-glass" and any more environmentally acceptable derivatives thereof such as low or free boron and/or fluorine derivatives. The fibers are attenuated from the fiber forming apparatus by winder 90, which gathers the fibers that are formed into one or more strands, here one strand, into a package of strand 88. As the fibers cool, they are passed in contact with an applicator 66 to apply a chemical composition used to protect the glass fibers in further processing, and, if used for reinforcement of Polymeric materials, to make the glass fibers more compatible with the polymeric materials. In addition, the material used as a sizing for treating glass fibers can include lubricants and wetting agents or merely water. The sized fibers are gathered into a strand at gathering shoe 70, which may rotate or be stationary, but it is preferably stationary for higher speeds of winding in order to avoid the failure of a rotating shoe. The gathering shoe 70 is located along the path of travel of the fibers and strands in such a manner that after the strand leaves the gathering device, the strand travels away from the gathering device to the opposite side from that side of the gathering device which contacts the fibers and gathers them into the strand. In FIG. 3, this direction would be out of the plane of FIG. 3, since the strand is contacted on the side of the gathering device seen in FIG. 3. This change in direction of the strand from the gathering shoe causes a predetermined fixed angle in the strand during the manufacture of the fibers into the strand. The gathering device 70 is affixed to shield 72 which rides on beam 78. Beam 78 is cantilever-mounted within the insulated housing 74. The insulated housing is held in position as is gathering shoe 70 by attachment means 63 which is attached to frame 62. Frame 62 can be the same frame or a different frame from that to which applicator 66 is attached and that forms the back of the fiber forming support structure. The housing 74 has a gas port 76 through which gas is supplied from a gas source not shown in FIG. 3. The gas, which is preferably air, enters the interior of the housing and exits through opening 80 between housing 74 and shield 72.

As the fibers are attenuated and gathered at gathering device 70 into a strand, the strand is wound by winder 90 into a package 88, a spiral 92 is used to keep the strand from being wound into a parallel arrangement in each succeeding layer. Focusing the cylindrical face of package 88 and looking up from the package to the fibers being attenuated from the heat softenable material, the gathering device 70 forms the apex in the path of travel of the fibers and strand. The spiral and winder are rotated by any suitable motor or motors not shown in FIG. 3 connected to adapting devices such as pulleys and belts to rotate the winder and the spiral. The fixed angle of bend of the fibers and strand about the gathering device causes a force to be exerted on the shield 72 which is translated into a displacement of beam 78. The displacement of beam 78 is sensed through sensing means 82 and 84 for the preferred orthogonal directions, the x and y directions which have preferably a 90° relationship to each other. The sensed displacement cause the sensing means to initiate a signal by preferably a change in source voltage which travels by electric circuit 86 via a conducting means, not shown here but as described for FIG. 1, that is connected to a tension indicating device not shown in FIG. 3 but comparable to that shown in FIG. 1. In addition to transferring the force from the gathering device to beam 78, the shield 72, in conjunction with the exiting gas from opening 80, assists in keeping to a minimum any sizing composition being applied to the fibers by applicator 66 from entering the interior of housing 74. Although it is shown in FIG. 3 that the gathering shoe 70 is attached to the enlarged shield 72, it is an alternative embodiment of the present invention to have the gathering shoe separate and affixed to frame 62 and have two or more rollers or levers attached to shield 72 over which the strand passes and undergoes a predetermined bend on its way to the winder. In this embodiment, the tension measuring device would be a portable tension measuring device. In the embodiment as shown in FIG. 3, the tension measuring device makes use of a natural bend in the process of forming the plurality of fibers into strands which exists from the gathering device 70 to spiral 92.

Figures 4, 4A:
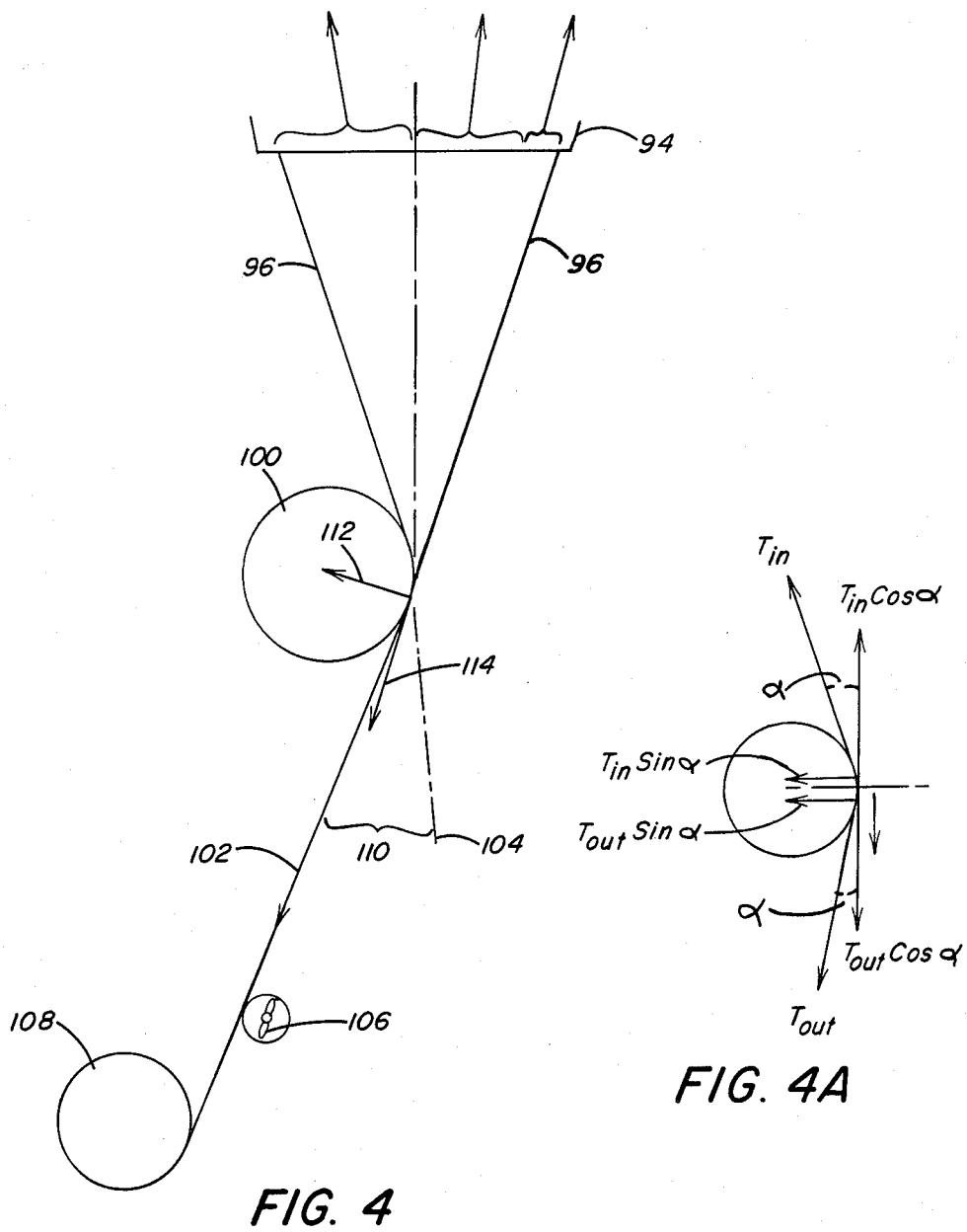
FIG. 4 is a diagramatic illustration of the force vectors on the tensiometer having the gathering shoe in the process of forming fibers.
FIG. 4A is a diagramatic illustration of the force vectors at the gathering shoe of the tensiometer of the present invention.

FIG. 4 further illustrates the advantage taken of the natural bend in the production of a plurality of fibers into one or more strands and the measuring of the tension of the fibers and strands. The fibers 96 are attenuated from the forming bushing 94 by the force applied to the strand from winder 108. The fibers are gathered into the strand by gathering shoe 100. At the gathering shoe, which is enlarged beyond its proportion to the other elements in the process of forming fibers for the purposes of illustration, the strand is bent to the left in FIG. 4 away from the vertical plane under the bushing 94. This angle, 110, is the angle of bend $\alpha$ which is used in calculating the components of the tension. The angle stays the same until the strand contacts spiral 106 and then the angle increases for the strand being placed on a package of winder 108.

The force components resulting from the bend which is a natural bend in the manufacture of fibers into strands are given in FIG. 4A. There it is shown that both the tension in and the tension out can be measured and the components resulting from the sines and cosines of the angle $\alpha$ can also be determined. In FIG. 4, 112 is the horizontal component of the force and 114 is the vertical component of the force.

From the equation for tension as a function of the forces in the horizontal and vertical directions, the formula for tension can be obtained. The tension in is equal to the horizontal force divided by 2 times the sine of $\alpha$ minus the vertical force divided by 2 times the cosine $\alpha$, since the horizontal force is equal to the horizontal constant times the voltage output in the horizontal direction and the vertical force is equal to the vertical constant times the vertical voltage output. The constant is measured in volts per gram, and the formula for tension in becomes K multiplied by the force in the (H) horizontal direction divided by 2 times cosine $\alpha$ minus K multiplied by the force in the (V) vertical direction two times the cosine of $\alpha$. If KH is set equal to 2 times sine $\alpha$ in kilograms per volt and KV is equal to two times the cosine $\alpha$ in kilograms per volt, the tension-in is equal to two times the sine of $\alpha$ divided by two times sine $\alpha$ times the voltage output in the horizontal direction minus two times the cosine of $\alpha$ divided by two times the cosine of $\alpha$ times the voltage output in the vertical direction. In other words, the tension in is equal to the voltage output from the horizontal minus the voltage output from the vertical. In measuring both axes of force simultaneously, the major component or the horizontal component is found along with the vertical component that results from friction and because of this orthogonal force set up the true input and output tension can now be measured along with the coefficient of friction.

In the alternative embodiments depicted in FIGS. 2 and 3, the entire alternative embodiments are not the only alternative embodiments for the present invention. The various individual alternative elements depicted FIGS. 2 and 3 can be combined in various combinations with the embodiment of FIG. 1 to give a myriad number of additional alternative embodiments. To further illustrate the present invention, the preferred embodiment is described further in the following description.

PREFERRED EMBODIMENT

In the preferred embodiment of the present invention as illustrated in FIG. 1, the cylindrical housing is covered with a polyurethane foam having a thickness of about 10 to about 50 millimeters. The beam 20 which is cantilever-mouted has a taper having a shape of an hour-glass, i.e., a concave curve of revolution. The target means is a square element 23 and the housing has two sensing means 28 and 30. The shield means rides on beam 20 which extends beyond the shield means to have rotatably mounted on beam 20 a gathering shoe 44. The opening 16 between shield means 26 and the housing 10 is sufficient to allow for the deflection of beam 20 without the shield 26 contacting housing 10. The gas from the gas supply 38 travels through the valve 39 and into conduit 40 and through port 42 into the interior of housing 10 to deliver air at a pressure of about 10 to about 40 psig. When the beam 20 is displaced due to the tension on fibers 46 and strand 48 contacting the rotating gathering shoe 44, the beam is displaced and this displacement also displaces target means 22 and 24. The displacement of the target means is picked up by sensing means 28 and 30, which send a signal by a change in the source voltage via conducting means 31 to the tension indicator 34.

The tension measuring device is used to measure the tension in glass fibers and strands in the forming process for the glass fibers. In order to measure tension, the tension measuring device is calibrated by clamping a rotatable straight surface to the outside of the housing to provide a reference axis that is parallel to one of the tensiometer's principle axes. This is adjusted by hanging weights from the end of the beam and observing the readings of the horizontal transducer or sensor. The horizontal transducer senses the vertical side of the target. When no change in the horizontal output is observed for changes in weight, the vertical target side is truly vertical. The rotatable straight surface is now clamped in position with the aid of an accurate level.

After calibration, the tension measuring device is installed in the forming process for manufacturing glass fibers. The gathering shoe is mounted in the normal position of tangent to the left side of a plum line dropped from the center line of the bushing. The bushing center line can be thought of as the average fan input line. To insure a wrap of all of the filaments, the output to the spiral is between 10° and 12° from the vertical. In other words, the fan average of the fibers as represented by the bushing center line, wraps from 10° to 12° around the gathering shoe. It is preferred to simplify the mounting trigonometry of the tensiometer by rotating the tensiometer one-half of the wrap angle. If the displacement sensitivities for the sensing transducers are set to two sine α in kilograms/volt and to two cosine α in kilograms per volt, where α is the half angle of rotation for the tensiometer, then the volt meter readings are scaled directly in kilograms of tension.

In setting up the tension measuring device for maximum linearity at the requisite sensitivity, a metal beam with 0.381 inch (9.68 millimeters) outside diameter (OD) is used as beam 20 for the tension measuring device. Two Kamen Eddy current sensors are mounted at right angles to each other in the housing to match the location of the two targets that are mounted at 90° to each other on beam 20. Preferably, a cyanoacrylate adhesive is used to mount the target means. The housing 10 is adjusted so the sensor axes and target faces are perpendicular to each other. The sensors are mounted on the housing to be within about 0.02 inch (0.51 mm) from the targets. This gap is an air gap between each target and the sensor. For an air purge, a quick release air connector is attached to the base of the tensiometer.

The electrical circuit consists of two digital volt meters such as those available from Fluke under the trade designation 8000 A and a dual voltage power supply such as that available from Hewlett-Packard under the trade designation 6205 and two Kamen model KD 2310-.0255 electronic units having associated electronics to improve the linearity of their response and two Kamen 850657-010 cables. The electrical circuit is constructed by adjusting the power supply for 12 volts DC current and connecting the cables to the power supply. The sensing cables are then connected to the Kamen electronic units and the power cables are also connected to the Kamen electronic units. One digital voltmeter is connected to the signal output leads of each cable. The electrical circuit is calibrated by setting the fine linearity control to the midrange. With the target at full scale displacement plus offset, 0.31 millimeters (0.012 inches), the course linearity control is adjusted for one volt. With the target at 0 displacement at the recommended offset of 0.002 inch, the zero control is adjusted until the output is zero volts. The target is moved away from the sensor to a displacement equal to one-half of the full scale displacement plus the offset or 0.007 inches. The gain control is adjusted for 0.5 volts. The target is then moved to full scale displacement for an offset of 0.31 millimeters (0.12 inch) and the output is read, and if there are any differences between the actual readings and the desired 1 volt reading, the course linearity control is used to adjust the output to the desired setting. The course linearity control is then adjusted to continue past the desired setting by an equal amount of the noted difference. The horizontal amplifier and the vertical amplifier are adjusted in a similar manner by placing a 200 gram weight on the beam while isolating one or the other amplifier and setting the scale for full scale displacement, zero displacement, half scale displacement.

Once the tension measuring device is calibrated, it can be installed in the process of forming glass fibers into strand. The tension measuring device is positioned in the center of an area beneath the bushing. The graphite shoe is set so that it would be 180° across from the horizontal. The angle from the center line of the bushing to the gathering shoe is measured and should be placed around 90°. The angle from the shoe to the spiral is measured and set. The angle from the shoe to the spiral is subtracted from the angle of the bushing to the shoe and the result is divided by two. The result is added to the angle of the shoe to the spiral. The tensiometer is then adjusted so that the level clamp is about 84°. The air purge line is connected to the tensiometer and adjusted to a pressure of about 20 psig. The horizontal and vertical sensors and cables for the electronic and conducting means units are connected to the tensiometer. And the horizontal and vertical amplifiers of the conducting means are readjusted for zero output for the zero control. The tensiometer is then used to measure tension of the fibers being pulled from the bushing and formed into the strand about the gathering shoe which is the strand engaging means of the tensiometer.

We claim:

1. An apparatus for measuring the tension in continuously moving fibers and/or strand that is formed from a plurality of fibers, comprising:
   a. a housing having a high resistance to the flow of heat that forms an enclosure with an opening at one end,
   b. a team that is cantilever-mounted within said housing to extend near the opening in the housing, where the beam is substantially surrounded by the housing except for the opening in which the beam can radially deflect,
   c. at least two target means located on the beam in the housing in relation to each other along two different axes in the same plane,
   d. at least two sensing means mounted to extend through the housing so that each one sensing means is in sensing engagement with one of the target means to sense a cantilever deflection of the beam, where the sensing means are adapted to produce a signal in response to the deflection of the beam,
   e. gas supply means connected to the housing to produce a flow of gas within the housing to exit through the opening in the housing in order to retard entrance of liquids into the housing,
   f. strand engaging means mounted at the distal end of the beam away from the point of cantilever-mounting of the beam to the housing and beydnd the opening in the housing to allow the strand which is under tension to engage the beam to produce strand tension, force components to deflect the beam and the target means on the beam which movement is sensed by the sensing means which produce a signal in response thereto,
   g. a conducting means connected to the sensing means to permit the sensing means to initiate signals and to convey the signal produced by the sensing means, and
   h. one or more indicating means to indicate the output from the signals of the sensing means which can be calculated into the magnitude of the tension and/or the coefficient of friction.

2. Apparatus of claim 1, wherein the housing is constructed of material selected from the group consisting of quartz, graphite, and reinforced polymers.

3. Apparatus of claim 1, wherein the housing has a cooling jacket.

4. Apparatus of claim 1, wherein the housing is externally insulated.

5. Apparatus of claim 1, wherein the housing has peripheral sides that are foam insulation having a thickness of about 0.5 to about 2 inches and the end is made of a material having effective rigidity to support the beam means.

6. Apparatus of claim 1, which includes a shielding means attached to the beam to cover the opening in the housing.

7. Apparatus of claim 1, wherein the housing is a circular elongated housing.

8. Apparatus of claim 1, wherein the housing has principal sides and a base side that are of a metallic material and on the external surface of the sides is attached insulating material having a thickness of 0.5 to about 2 inches.

9. Apparatus of claim 1, wherein the beam is solid and is tapered at the proximate end of the beam in relation to the cantilever-mounting of the beam.

10. Apparatus of claim 1, wherein the beam is solid and continuous.

11. Apparatus of claim 1, wherein the beam is hollow.

12. Apparatus of claim 1, wherein the beam is cantilever-mounted to the housing at the end opposite the opening in the housing.

13. Apparatus of claim 1, wherein the target means are magnetic volumes and the sensing means are linear variable differential transformers 14. Apparatus of claim 1, wherein the target means are flattened portions of the beam means and the sensing means are noncontact sensors.

15. Apparatus of claim 1, which includes a rectangular means having an opening in the center through which it is mounted on the beam, wherein the target means are the flat peripheral sides of the rectangular means.

16. Apparatus of claim 1, wherein the target means is located on the distal portion of the beam from the cantilever mounting and within the housing.

17. Apparatus of claim 1, wherein the strand engaging means is rotatably mounted at the distal end of the beam within the housing.

18. Apparatus of claim 17, wherein the strand engaging means is a gathering shoe.

19. Apparatus of claim 1, wherein the strand engaging means is a gathering shoe.

20. Apparatus of claim 1, wherein the indicating means calculates the tension from the output signals of the sensing means and indicates the magnitude of the tension and/or the coefficient of friction.

21. Apparatus of claim 1, wherein the gas supply means includes a gas supply source which is connected to an opening in the housing.

22. Apparatus of claim 1, wherein the flow of gas within the housing to exit through the opening in the housing is at an effective pressure in the range of about 0.5 to about 80 psig.

23. Apparatus of claim 1, wherein the conducting means is an electrical circuit connected to the sensing means to condition the output signal of the sensing means and convey the conditioned signal to the indicating means.

24. Apparatus of claim 1, wherein one target means and the sensing means in sensing engagement with that target means are 90° in the same plane from the second target means and the sensing means in sensing engagement with the second target means.

25. A method of measuring tension in one or more strands produced in a fiber forming process, comprising:
   a. forming a plurality of fibers through orifices from a molten supply of fiberizable material,
   b. treating the plurality of fibers with a chemical composition,
   c. gathering the treated fibers into one or more strands at a gathering means,
   d. measuring the tension on the one or more strands by a beam which engages the gathering means and is cantilever-mounted within a housing enclosing the beam with at least one peripheral side and one end and having an opening at the opposite end sufficient for emergence of the beam from the housing and for vibration of the beam, where the housing has a high resistance to the flow of heat and has a connection to a gas supply means to allow gas to flow through the housing and out the opening, and where the beam has at least two target means along different axes in the same plane, which are in sensing engagement with at least two sensing means,
   e. winding the strand off-center from directly under where the strand is gathered to cause a fixed angle of bending in the strand about the gathering means,
   f. sensing the deflection of the beam caused by the tension in the strand moving in engagement with the gathering means,
   g. conducting at least the signals initiated by the sensing means in response to the sensed displacement, and
   h. indicating the tension as an output response to the sensing of the deflection, where the tension has been compensated for any friction introduced in taking the tension measurement.

* * * * *

UNITED STATES PATENT AND TRADEMARK OFFICE
CERTIFICATE OF CORRECTION

PATENT NO. : 4,546,656

DATED : October 15, 1985

INVENTOR(S) : Reed H. Grundy et al.

It is certified that error appears in the above-identified patent and that said Letters Patent is hereby corrected as shown below:

Column 16, line 27, delete "team" and insert --beam--.

Column 16, line 36, delete the word "one".

Column 16, line 47, delete "beydnd" and insert --beyond--.

Column 17, line 12, delete "principal" and insert --peripheral--.

Column 17, line 28, insert a period --.-- after "transformers".

Signed and Sealed this

*Eleventh* Day of *March 1986*

[SEAL]

*Attest:*

DONALD J. QUIGG

*Attesting Officer*     *Commissioner of Patents and Trademarks*